United States Patent
Wei et al.

(10) Patent No.: US 9,728,771 B2
(45) Date of Patent: Aug. 8, 2017

(54) PROTON-BATTERY BASED ON GRAPHENE DERIVATIVES

(71) Applicant: Nokia Corporation, Espoo (FI)

(72) Inventors: Di Wei, Cambridge (GB); Stefano Marco Borini, Cambridge (GB); Richard White, Huntingdon (GB); Jani Kivioja, Cambourne (GB)

(73) Assignee: Nokia Technologies Oy, Espoo (FI)

( * ) Notice: Subject to any disclaimer, the term of this patent is extended or adjusted under 35 U.S.C. 154(b) by 1003 days.

(21) Appl. No.: 13/900,820

(22) Filed: May 23, 2013

(65) Prior Publication Data

US 2014/0349211 A1    Nov. 27, 2014

(51) Int. Cl.

| H01M 8/10 | (2016.01) |
|---|---|
| H01M 4/06 | (2006.01) |
| H01M 6/04 | (2006.01) |
| H01M 6/18 | (2006.01) |
| H01M 8/0206 | (2016.01) |
| H01M 8/08 | (2016.01) |
| H01M 8/1009 | (2016.01) |
| H01M 8/1039 | (2016.01) |

(Continued)

(52) U.S. Cl.
CPC ............. *H01M 4/06* (2013.01); *H01M 4/583* (2013.01); *H01M 4/661* (2013.01); *H01M 4/74* (2013.01); *H01M 6/045* (2013.01); *H01M 6/181* (2013.01); *H01M 6/26* (2013.01); *H01M 6/40* (2013.01); *H01M 8/0206* (2013.01); *H01M 8/08* (2013.01); *H01M 8/1009* (2013.01); *H01M 8/1039* (2013.01); *H01M 12/005* (2013.01); *H01M 14/00* (2013.01); *H01M 2300/0002* (2013.01); *H01M 2300/0082* (2013.01)

(58) Field of Classification Search
CPC ........ H01M 4/06; H01M 4/583; H01M 4/661; H01M 4/74; H01M 6/045; H01M 6/181; H01M 6/26; H01M 6/40; H01M 8/0206; H01M 8/08; H01M 8/1009; H01M 8/1039
See application file for complete search history.

(56) References Cited

U.S. PATENT DOCUMENTS

| 5,731,105 A | 3/1998 | Fleischer et al. |
|---|---|---|
| 6,387,238 B1 * | 5/2002 | Merk ..................... A01N 37/16 204/252 |

(Continued)

FOREIGN PATENT DOCUMENTS

| GB | WO 2012046069 A1 * | 4/2012 | ............. B82Y 30/00 |
|---|---|---|---|
| KR | 20130027195 A | 3/2013 | |

OTHER PUBLICATIONS

Yao, P. et al.; "Electric Current Induced Reduction of Graphene Oxide and Its Application as Gap Electrodes in Organic Photoswitching Devices"; 2010; Advanced Materials, vol. 22; pp. 5008-5012; Wiley-Vch Verlag GmbH & Co. KGaA, Weinheim.

(Continued)

*Primary Examiner* — Milton I Cano
*Assistant Examiner* — Jimmy K Vo
(74) *Attorney, Agent, or Firm* — Harrington & Smith

(57) ABSTRACT

An apparatus comprises an anode formed of graphene oxide from an acidic pH; a cathode from a pH greater than the acidic pH of the anode; and charge collectors deposited on the anode and the cathode. The anode comprises graphene oxide, the graphene oxide comprising an ink and having a pH of about 1 to about 4.

5 Claims, 16 Drawing Sheets

(51) Int. Cl.
*H01M 12/00* (2006.01)
*H01M 4/583* (2010.01)
*H01M 4/66* (2006.01)
*H01M 4/74* (2006.01)
*H01M 6/26* (2006.01)
*H01M 6/40* (2006.01)
*H01M 14/00* (2006.01)

(56) References Cited

U.S. PATENT DOCUMENTS

| | | |
|---|---|---|
| 2003/0141188 A1 | 7/2003 | Imamura et al. |
| 2010/0062333 A1 | 3/2010 | Chuang et al. ............... 429/204 |
| 2011/0117454 A1* | 5/2011 | Winther-Jensen ..... H01B 1/122 429/402 |
| 2011/0135967 A1* | 6/2011 | Pellissier ................ H01M 8/16 429/2 |
| 2011/0183180 A1 | 7/2011 | Yu et al. |
| 2012/0026643 A1 | 2/2012 | Yu et al. |
| 2012/0328956 A1* | 12/2012 | Oguni ................... H01M 4/625 429/232 |
| 2013/0045418 A1 | 2/2013 | Oguni et al. |
| 2013/0190449 A1* | 7/2013 | Kinloch ................ B82Y 30/00 525/50 |
| 2013/0212879 A1 | 8/2013 | Ogino ............................ 29/885 |

OTHER PUBLICATIONS

Dimiev, A. et al.; "Graphene Oxide. Origin of Acidity, Its Instability in Water, and a New Dynamic Structural Model"; 2013; ACSNANO, vol. 7, No. 1; pp. 576-588; American Chemical Society.

Fan, X. et al.; "Deoxygenation of Exfoliated Graphite Oxide under Alkaline Conditions: A Green Route to Graphene Preparation"; 2008; Advanced Materials, vol. 20; pp. 4490-4493; Wiley-Vch Verlag GmbH & Co. KGaA, Weinheim.

Feng, H. et al.; "A low-temperature method to produce highly reduced graphene oxide"; Feb. 26, 2013; Nature Communications; pp. 1-7; Macmillan publishers Limited.

Yap, S.C. et al.; "Proton Batteries with Hydroponics Gel as Gel Polymer Electrolyte"; 2007; Electrochemical and Solid-State Letters, vol. 10, No. 6; pp. A139-A141; The Electrochemical Society.

Pratap, R. et al.; "Polymeric rechargeable solid-state proton battery"; 2006; Journal of Power Sources, vol. 161; pp. 702-706; Elsevier B.V.

* cited by examiner

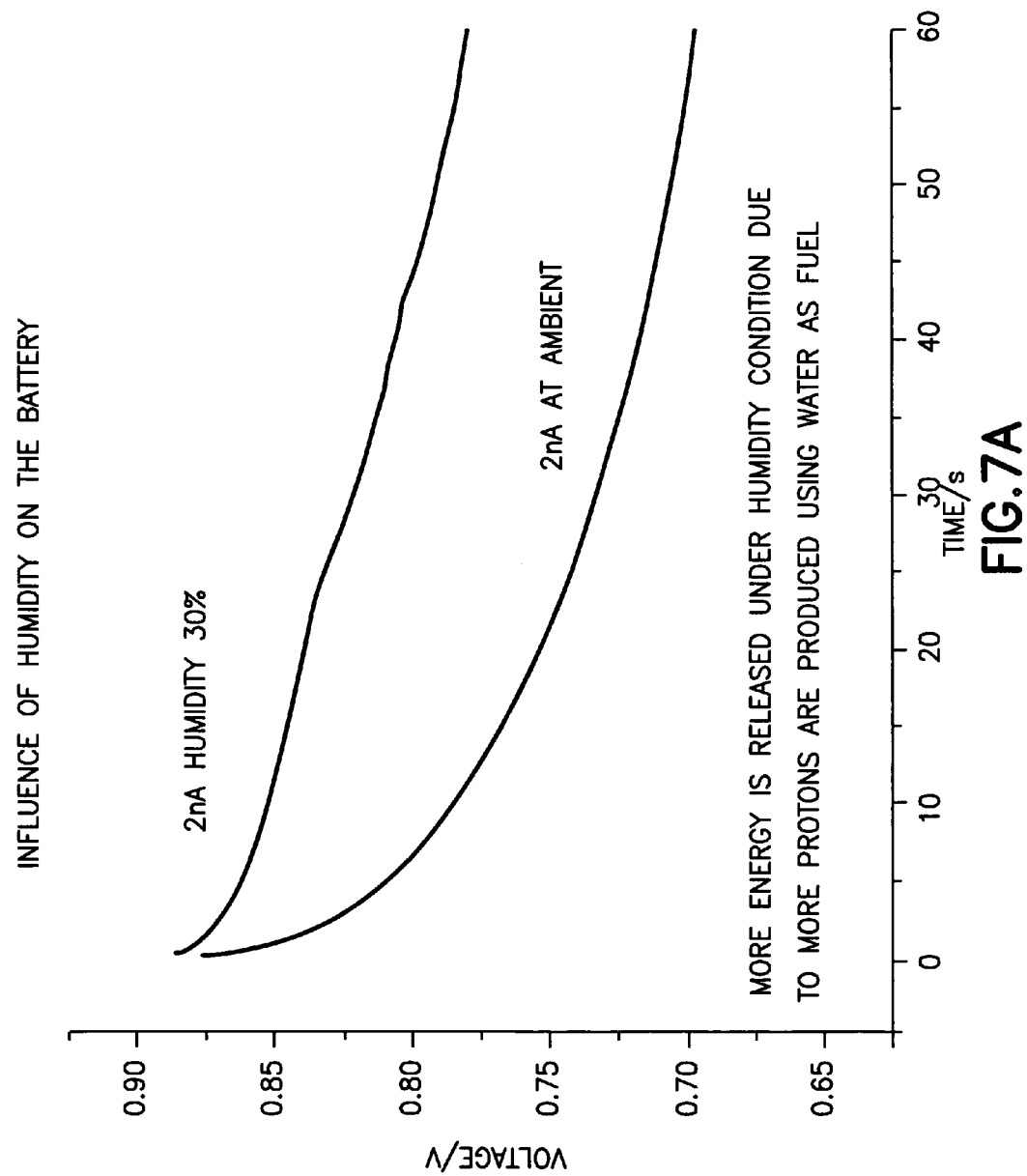

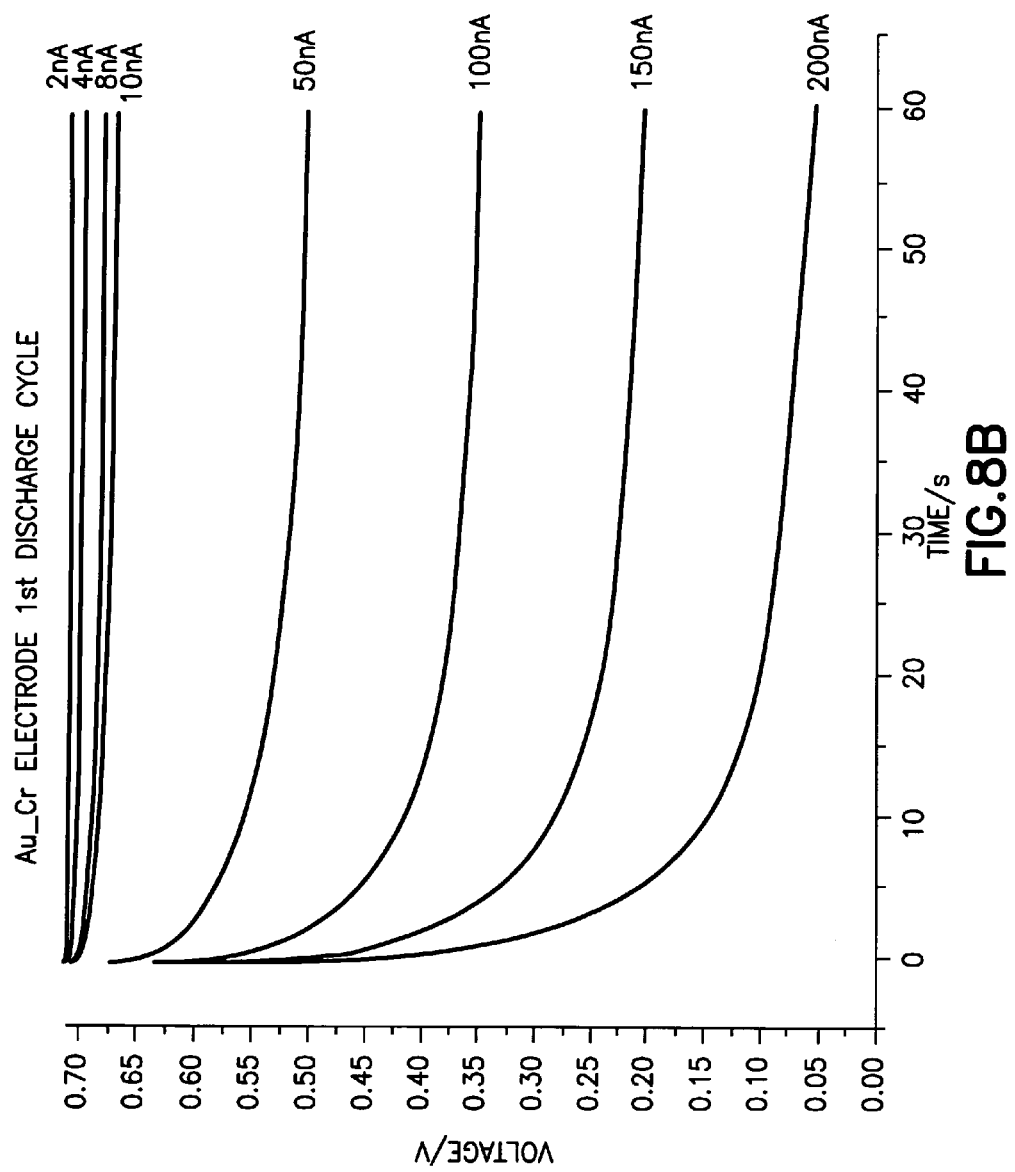

PROTON-BATTERY BASED ON GRAPHENE DERIVATIVES

BACKGROUND

Technical Field

The exemplary and non-limiting embodiments described herein relate generally to energy storage devices based on proton generation and, more particularly, to batteries that generate protons from graphene derivatives.

Brief Description of Prior Developments

Protons are capable of being generated and stored for use in fuel cells and in other energy applications. Protons are typically generated from hydrogen gas using platinum catalysts, which are generally high in cost. Storage of the protons may also be problematic.

SUMMARY

The following summary is merely intended to be exemplary. The summary is not intended to limit the scope of the claims.

In accordance with one aspect, an apparatus comprises an anode formed of graphene oxide from an acidic pH; a cathode from a pH greater than the acidic pH of the anode; and charge collectors deposited on the anode and the cathode.

In accordance with another aspect, another apparatus comprises a first graphene oxide-based material having a first functionality of a first concentration; a second material having a second functionality of a second concentration; a junction defined by an interface of the first graphene oxide-based material positioned adjacent and in contact with the second material; and electrodes formed on each of the first graphene oxide-based material and the second material. Protons are configured to be dissociated from the first functionality of the first graphene oxide-based material by water and are configured to be migratable across the junction to the second material based on a pH gradient across the first graphene oxide-based material and the second material.

In accordance with another aspect, a method comprises dissociating hydrogen from functional groups of a first graphene oxide-based material to form protons; causing the protons to diffuse from the first graphene oxide-based material across a junction to a second material; and determining a value representing a voltage based on the diffusion of the protons to the second material.

BRIEF DESCRIPTION OF THE DRAWINGS

The foregoing aspects and other features are explained in the following description, taken in connection with the accompanying drawings, wherein:

FIG. 7A is a graphical representation of the influence of humidity on a GO proton battery;

FIGS. 8A and 8B are graphical representations of contact influences on a GO proton battery at ambient atmosphere;

DETAILED DESCRIPTION OF EMBODIMENT

Figure 1:
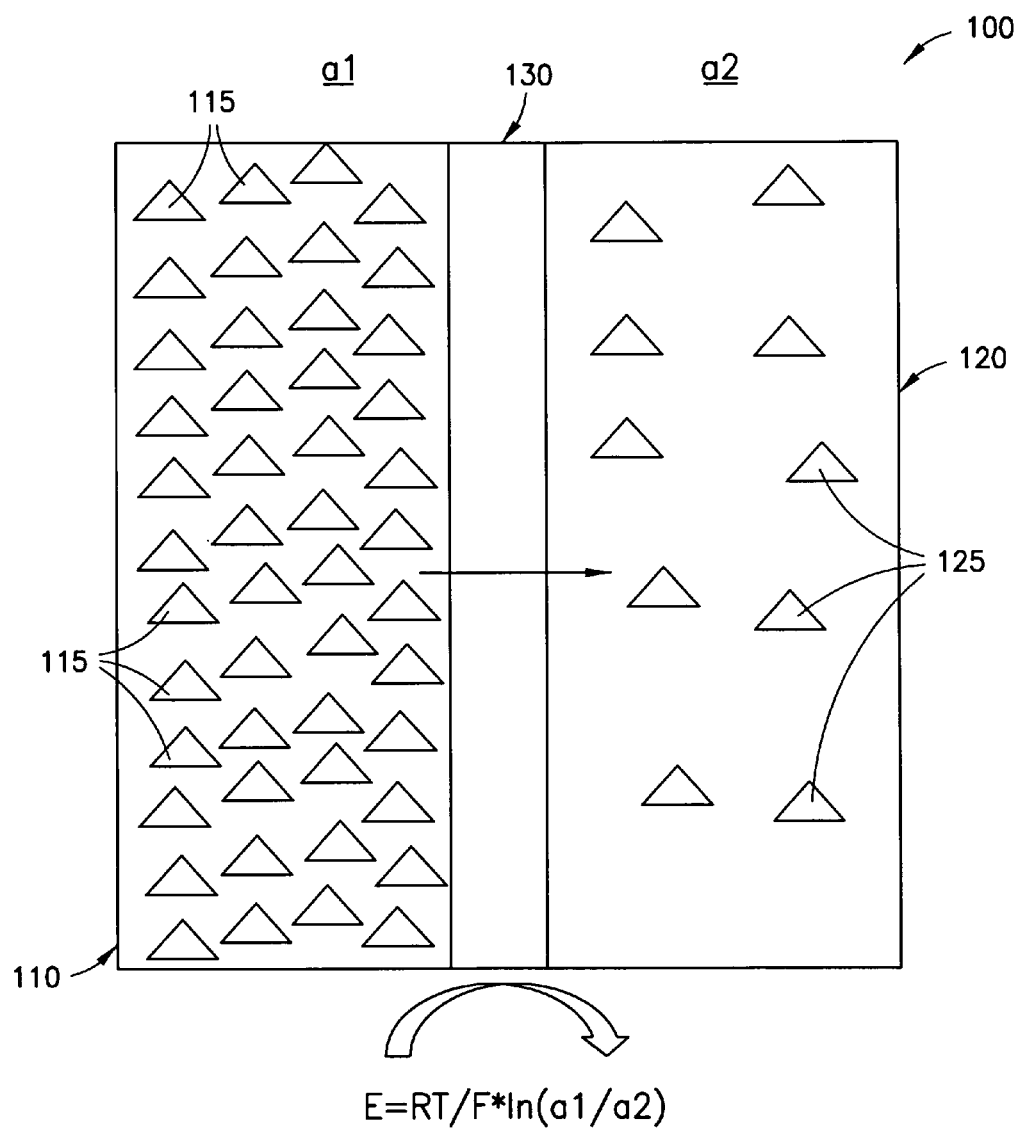
FIG. 1 is a schematic representation of one exemplary embodiment of a concentration cell.

Referring to FIG. 1, a schematic representation of one exemplary embodiment of a concentration cell is designated generally by the reference number 100 and is hereinafter referred to as "cell 100." Although the features will be described with reference to the exemplary embodiment shown in the drawings, it should be understood that features can be embodied in many alternate forms. In addition, any suitable size, shape, or type of elements or materials could be used.

Cell 100 comprises a first half cell 110 having a first concentration of ions 115 and a second half cell 120 having a second concentration of ions 125. The ions 115 of the first half cell 110 are separated from the ions 125 of the second half cell 120 by a membrane 130. The cell 100 generates a voltage as a result of ion migration across the membrane 130 when the cell 100 attempts to reach equilibrium. In general, the cell 100 may be defined by AgAgCl(S)LiCl(C1)Li—Hg (x1)-Hg(x1)-LiLiCl(C2)AgCl(S)Ag, AgAgCl(S)LiCl(C1) LiCl(C2)AgCl(S)Ag, or the like.

A voltage of the cell 100 can be calculated for different concentration gradients. For example, if the first half cell 110 has a proton concentration a1 and a pH of 4 and if the second half cell 120 has a proton concentration a2 and a pH of 13, according to the Nernst equation $E=(RT/F)*\ln(a1/a2)$, the voltage of the cell 100 is 56.39 mV.

Figure 2:
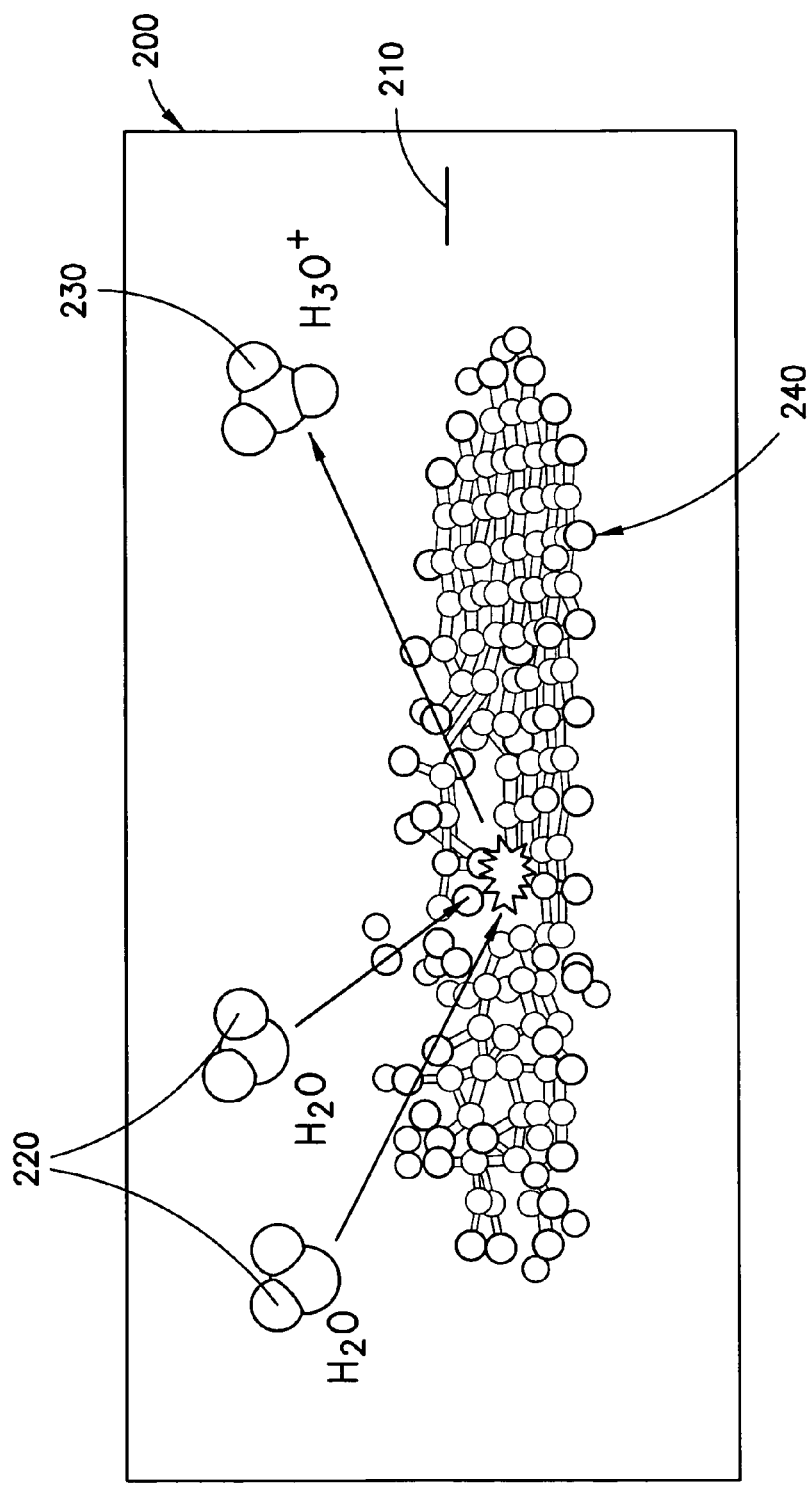
FIG. 2 is a schematic representation of one exemplary embodiment of a system for the generation of protons.

Referring now to FIG. 2, a system 200 comprising a graphene oxide (GO) solution 210 with a pH of about 4 can be made by Hummer's method. When a base (e.g., KOH) is added to the GO solution 210 to adjust the pH to 13, functionalization and/or reduction of the GO occurs (e.g., the surface function groups change). Also, one proposed mechanism that describes the protonation of the system 200 (where mGO⁻ denotes modified GO) may be written as:

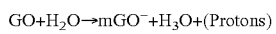

$$GO + H_2O \rightarrow mGO^- + H_3O^+ (\text{Protons})$$

Thus, in the exemplary embodiments of system 200, water 220 is used as fuel to generate protons 230 from a graphene-based derivative 240 (e.g., the GO). The protons 230 generated from the graphene-based derivative 240 (e.g., the GO) may be used to make a proton battery having supercapacitor properties.

Figure 3:
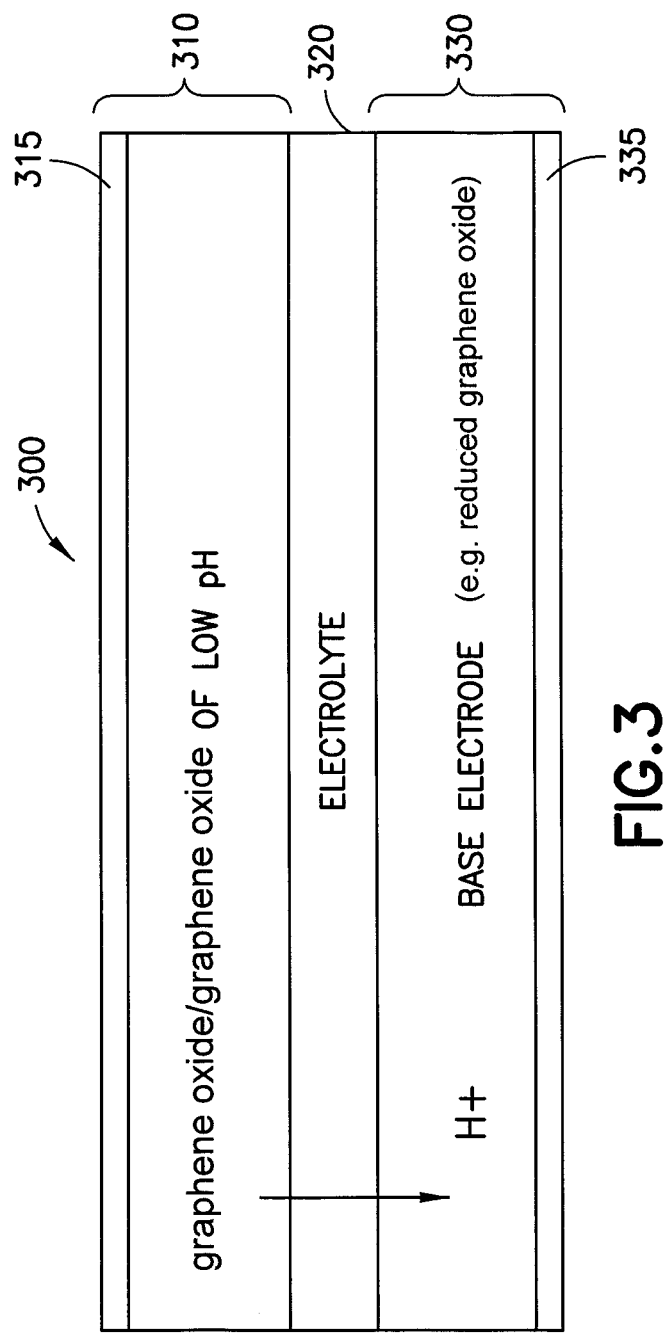
FIG. 3 is one exemplary embodiment of a GO proton battery based on the system of FIG. 2.

Referring now to FIG. 3, one exemplary embodiment of a GO proton battery (which is distinct from the cell 100 of FIG. 1) is designated generally by the reference number 300 and is hereinafter referred to as "battery 300." In general, batteries use electrodes to store ions (e.g., lithium ions can be stored in batteries, protons can be stored in fuel cells, and the like). Some batteries can store protons using hydroponic gels. In one type of proton battery, the anode is generally a mixture of Zn and $ZnSO_4$ and the cathode is generally $MnO_2$. Polymeric proton batteries may also use $V_2O_5$ and $PbO_2$ as cathodes and a mixture of Zn and $ZnSO_4$ as anodes. Such batteries also use proton-containing acidic electrolyte solutions. The structures and materials of these batteries are intrinsically different than the battery 300.

The battery 300 uses a GO electrode based on the system 200 (from FIG. 2) as a dynamic source to generate protons. The generation of protons is facilitated by the presence of water. The configuration of the GO electrode with the water and the higher pH media renders the battery 300 a dynamic battery. In other words, the battery 300 is capable of regenerating itself immediately after discharge through continuous chemical reactions. In particular, the battery 300 may be automatically charged back to open circuit voltage without an external energy input. The result is a low-power, energy-autonomous device.

In one exemplary embodiment, the battery 300 comprises an anode 310 formed of a first charge collector 315 and GO from low pH inks (e.g., original GO from Hummer's method or a solution of GO having a pH of about 1 to about 4). The first charge collector 315 may comprise, for example, Au, Cr, Ag, Al, Cu, ITO (indium tin oxide), combinations of the foregoing materials, or the like.

An electrolyte 320 may be located adjacent the anode 310 to favor and/or control the diffusion of protons between the anode 310 and a cathode 330, as described below. The electrolyte 320 may comprise a proton conductor film or membrane in the form of a synthetic ionomer such as sulfonated tetrafluoroethylene-based fluoropolymer-copolymer (e.g., NAFION or the like), or it may comprise optimized liquid electrolyte and/or water vapor having an optimized and controlled vapor concentration to provide the water as the fuel. In embodiments employing the electrolyte 320, the film or membrane of the electrolyte 320 forms a junction between the anode and the cathode 330. The electrolyte 320 can be encapsulated into a battery package or as the proton conductor film with a specific amount of humidity.

The cathode 330 is located adjacent the anode 310 or, in embodiments employing the electrolyte 320, located adjacent the electrolyte 320. The cathode 330 is formed of a base, such as KOH coated onto a stainless steel mesh electrode, or it may comprise GO from high pH inks (e.g., GO ink having a pH of about 13 or 14 or at least having a pH that is higher than that of the anode). A second charge collector 335 (comprising, for example, Au, Cr, Ag, Al, Cu, ITO, combinations of the foregoing materials, or the like) is included with the cathode 330.

In another exemplary embodiment, the battery 300 can comprise a GO cathode and a GO-based anode (e.g., reduced GO (rGO)) formed of a high pH ink (pH of about 13). For example, the structure of the battery 300 can be Au-GO/Humidity 15%/Au-GO (pH=13). This embodiment of the battery 300 can be fabricated by stacking two gold electrodes as charge collectors on top of two different GO films deposited by a drop cast method.

During operation, the battery 300 can generate an open circuit voltage on the order of about 1 volt (V) when in the presence of humid air (for example, when the relative humidity is about 30%). The battery 300 also exhibits a fast recovery of its voltage within a few minutes after being fully discharged and without the application of external energy. This recovery recharges the battery 300 and is carried out through contact of the electrolyte 320 with humid air or exposure of the electrolyte 320 to a specific humidity level as long as the GO has not been completely consumed for the generation of protons.

The battery 300 can be made flexible using printing technology. For example, the battery 300 can be printed onto a flexible substrate. The battery 300 can also be made to have highly transparent optical properties or elastomeric properties.

Furthermore, the battery 300 is configured such that an open circuit voltage ($V_{oc}$) ranges from about 1 V to about 0.6 V depending on the base cathode used, the electrolyte, and the materials of the charge collectors (e.g., Au, Cr, Ag, Al, Cu, and ITO). The $V_{oc}$ is therefore generally much higher than a simple proton concentration cell, which typically has a $V_{oc}$ of about 0.056 V and cannot recover once discharged. Therefore, the battery 300 intrinsically operates as a hybrid supercapacitor-battery.

Figure 4:
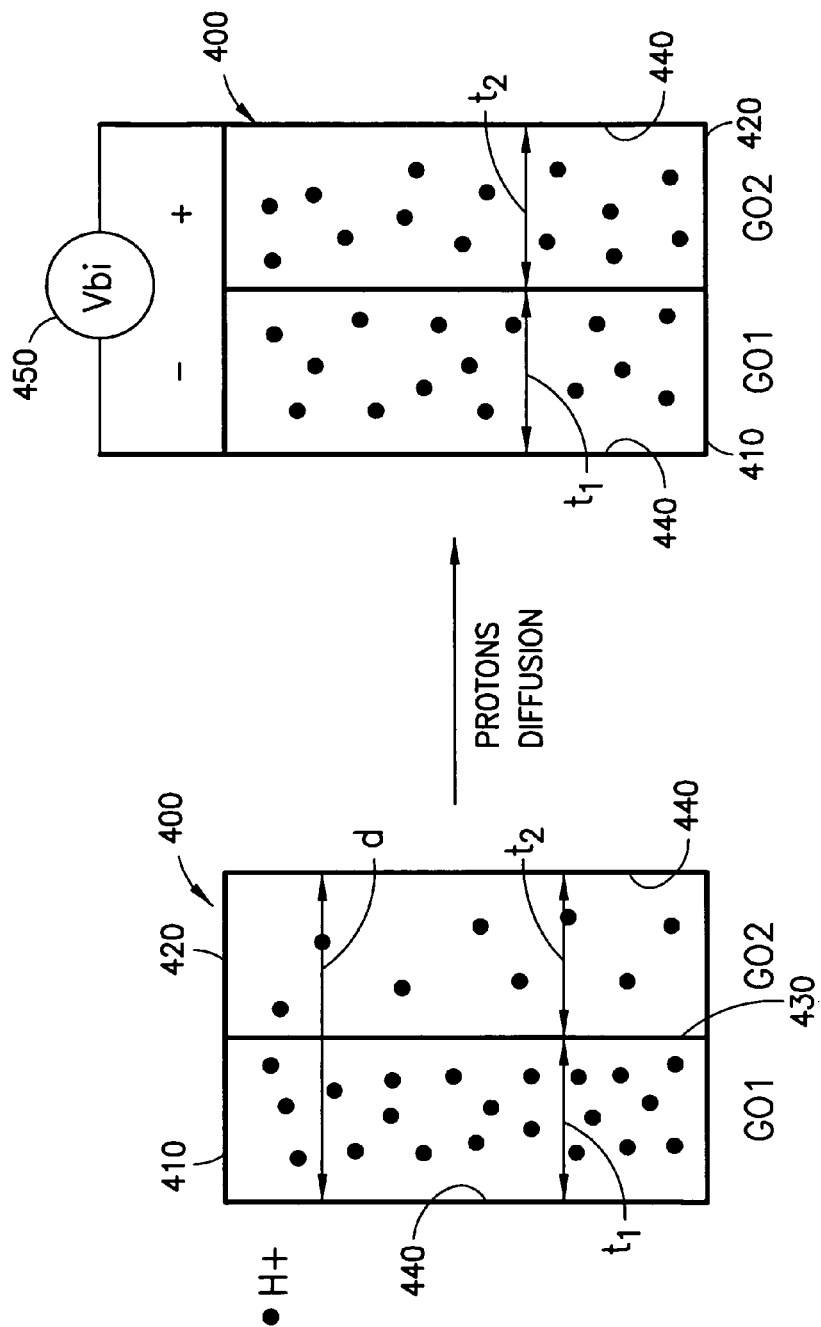
FIG. 4 is a schematic representation of one exemplary embodiment of an electrical device comprising two graphene oxide-based materials for forming a junction across which a potential is measured.

In another exemplary embodiment, as shown in FIG. 4, an electrical device is designated generally by the reference number 400 and is hereinafter referred to as "device 400." Device 400 is configured for the formation of an open circuit voltage across a junction of two GO-based materials in the presence of water, each of the GO-based materials having different concentrations of functional groups (e.g., hydroxyl groups, carboxyl groups, and the like).

The device 400 comprises a first layer of GO 410 having a first concentration of functional groups and a second layer 420 having a second concentration of functional groups. The second layer 420 comprises any graphene derivative such as rGO or any substantially two-dimensional material such as, for example, BN, $MS_2$, $WS_2$, $NbSe_2$, $Bi_2Sr_2CaCu_2O_x$, combinations of the foregoing materials, or the like. The functional groups of the first layer of GO 410 may be the same as or different from the functional groups of the second layer 420. The first concentration of functional groups is different from the second concentration of functional groups. The device 400 also comprises a junction 430, which is defined by the interface of the first layer of GO 410 and the second layer 420. Charge collectors 440 are formed on opposing sides of the first layer of GO 410 and the second layer 420.

To fabricate the layers 410, 420, a GO (or an rGO or other) film can be deposited by a drop cast method, spray coating, spin coating, or ink-jet printing on top of a substrate. Materials from which the substrate may be fabricated include, but are not limited to, polyethylene naphthalate (PEN), polyethylene terephthalate (PET), glass, and silicon.

The junction 430 may be formed by the deposition of two different materials (with or without aid of a mask). In some embodiments, a "graded" junction may be obtained from the same GO solution by introducing a gradient in the volume concentration of nanoflakes used to form a film along a distance d separating the charge collectors 440, or by introducing a gradient in the film thickness. In other embodiments, both layers 410, 420 may be the same GO material, with one of the layers being thicker than the other (where a thickness $t_1$ is greater than a thickness $t_2$) so as to provide a gradient in the concentration of generated protons. In any embodiment, a gradient in the amount of functional groups across the junction 430 can be achieved. In still other embodiments, the junction 430 may be formed after the film deposition process by a local reduction of a part of a GO film, for example, by local laser irradiation. Also, a junction may be formed by coating half of a GO film with polydimethylsiloxane (PDMS) and heating the film. Under the PDMS coating, the GO is reduced and a GO-rGO junction is formed.

GO materials with different concentrations of functional groups may be obtained by either further oxidizing or reducing a pristine GO solution. For example, increasing the pH of a GO solution is known to result in a reduction of the GO.

In any embodiment, the functional groups dissociate from the GO material, which liberates the hydrogen ions or protons. When the protons diffuse across the junction 430, a built-in potential 450 is generated and displayed. This built-in potential 450 is tuned by the presence of humidity. In particular, the built-in potential 450 is directly dependent on a water vapor concentration proximate the junction 430. This may allow for applications of the device 400 (and variants thereof) in fields such as fuel cells, energy storage, and sensing.

In one exemplary operation of the device 400, the first layer of GO 410 simply comprises GO, and the second layer 420 comprises rGO. In the presence of water vapor, hydrogen ions can be dissociated within the GO material of the first layer of GO 410 and, to a different extent, within the rGO material of the second layer 420, due to the different concentrations of functional groups in the two materials. Hydrogen ions diffuse through the junction 430 until a dynamic thermal equilibrium is reached, giving rise to the built-in potential.

In the device 400, different relative humidity values in the first layer of GO 410 and the second layer 420 can give rise to different proton concentrations on the two sides of the junction 430. In other words, there can be different proton gradients and therefore different open circuit voltages at equilibrium. Furthermore, a constant flow of humid air at the junction 430 can sustain a proton gradient as long as protons can be dissociated at least at one side of the junction 430. The GO can act as a proton source in the presence of water until all the functional groups of the GO become consumed.

The same concept may be extended to different surface functionalities and/or to different vapors, using either functionalized graphene or other substantially two-dimensional materials including BN, $MoS_2$, $NbSe_2$ and $Bi_2Sr_2CaCu_2O_x$.

The exemplary embodiments of the systems, batteries, and devices as described herein are also applicable to biological processes. In biological processes, the direction an ion moves by diffusion or active transport across a membrane is determined by an electrochemical gradient. Proton gradients are used to generate a chemiosmotic potential that is also known as a proton motive force. This potential energy is used for the synthesis of adenosine triphosphate (ATP) by oxidative phosphorylation in cell biology. Such a junction also has potential applications in biological sensors.

Example 1

Figure 5:
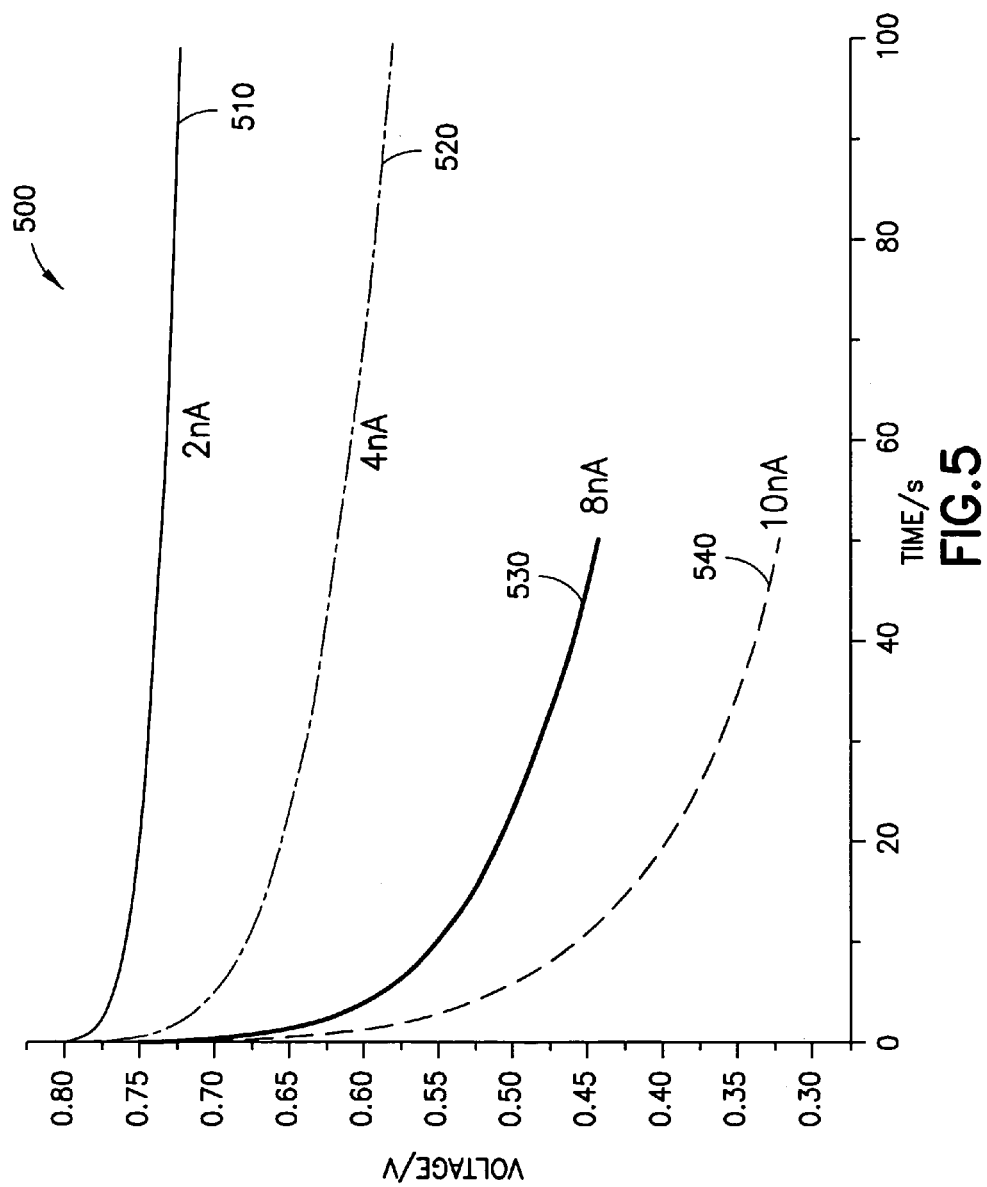
FIG. 5 is a graphical representation illustrating discharge rates of the GO proton battery of FIG. 3 at various current densities.

Referring now to FIG. 5, discharge rates of the battery 300 at different current densities are shown generally at 500. A discharge rate of the battery having a current value of 2 nanoamperes (nA) is shown at 510, a discharge rate of the battery having a current value of 4 nA is shown at 520, a discharge rate of the battery having a current value of 8 nA is shown at 530, and a discharge rate of the battery having a current value of 10 nA is shown at 540. The battery 300 exhibiting the foregoing discharge rates is embodied by a structure comprising Au-GO/Humidity 15%/Au-GO (pH=13).

Example 2

Figure 6A:
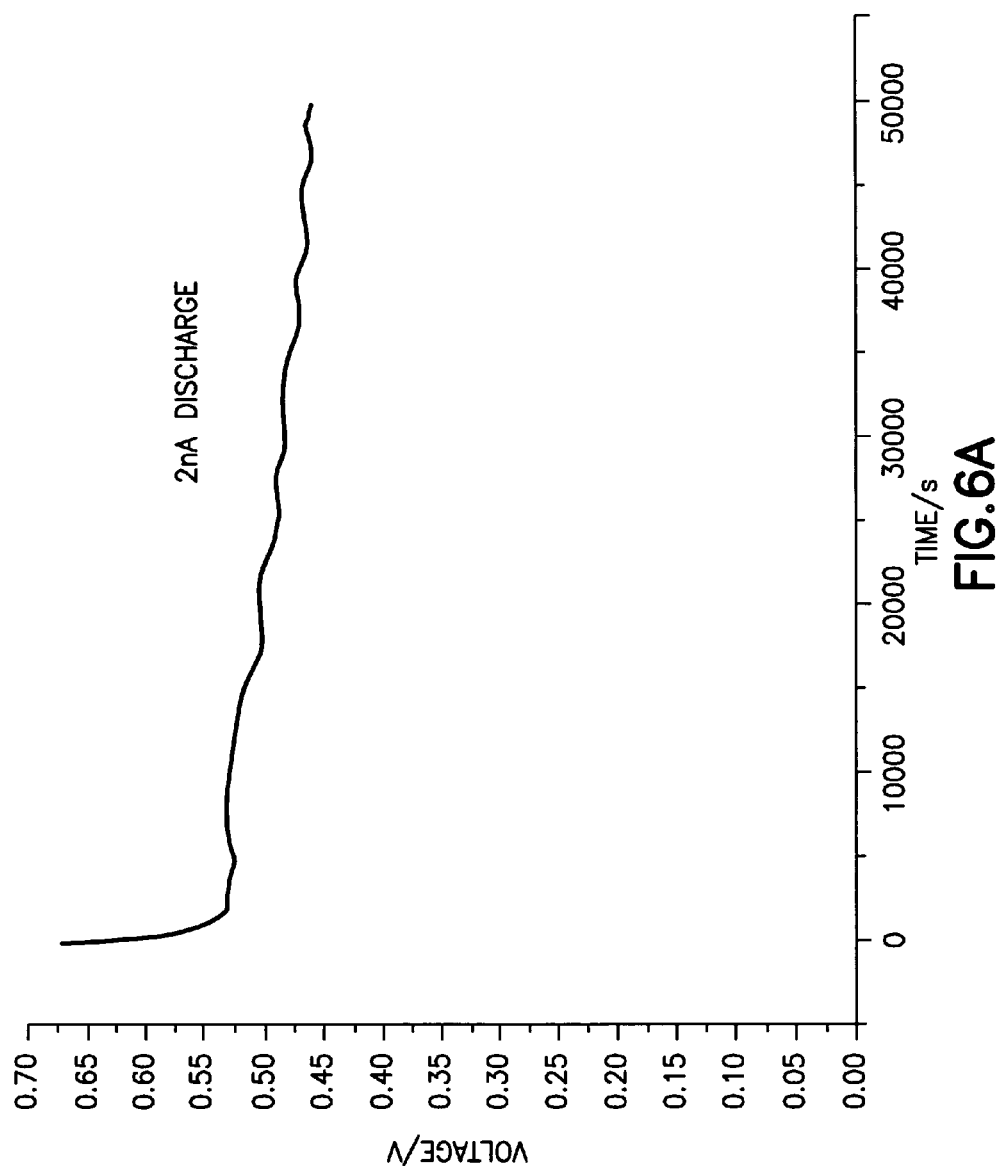
FIGS. 6A and 6B are graphical representations of discharge rates of a GO proton battery at different discharge currents.
Figure 6B:
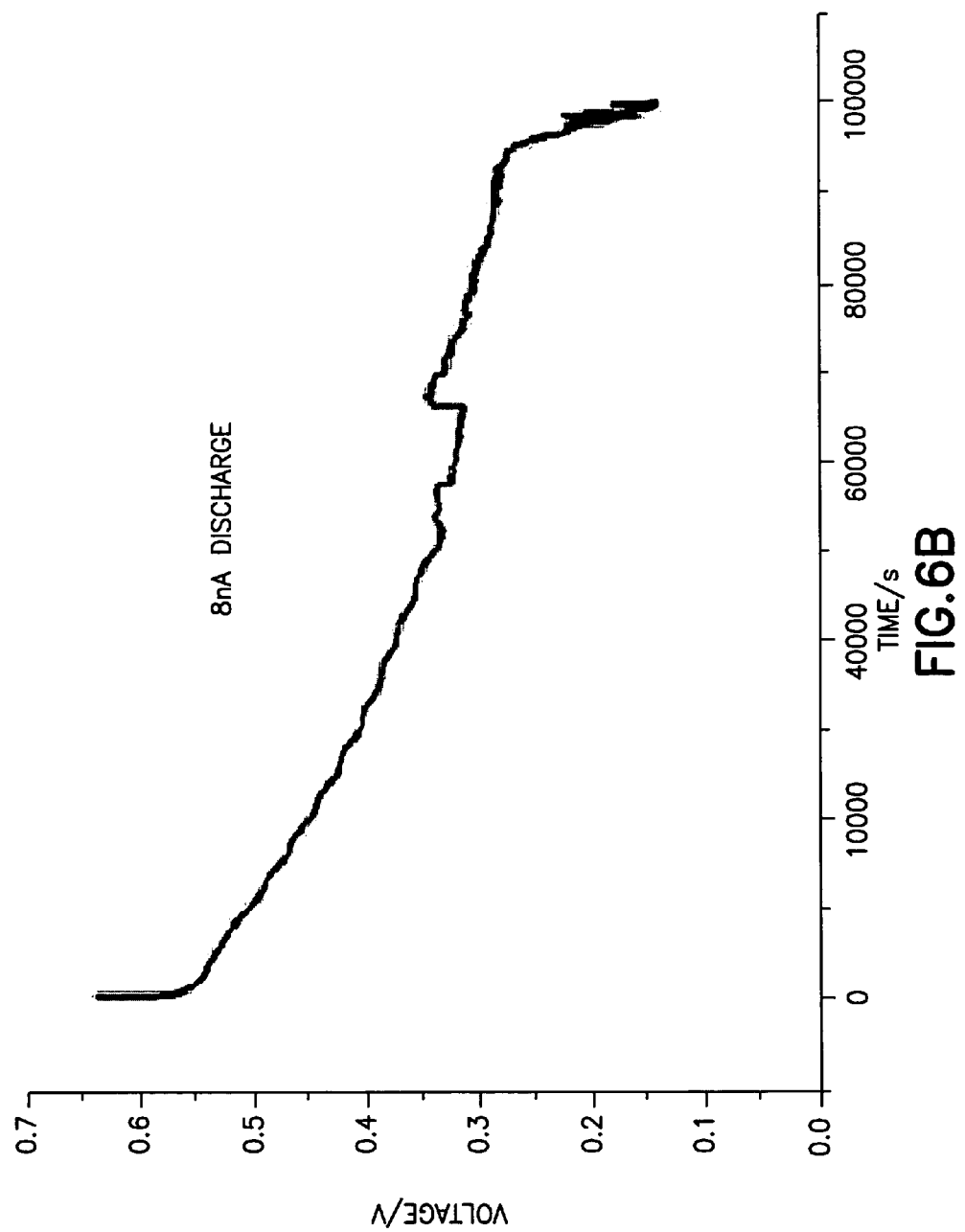

Referring now to FIGS. 6A and 63, discharge experiments were carried out for the battery 300 embodied by the structure comprising Au-GO/Humidity 15%/Au-GO (pH=13). As FIG. 6A illustrates, at a discharge current of 2 nA for 50,000 seconds (about 14 hours), the voltage dropped from 0.65 V to 0.5 V and could not be driven to 0 V even at a discharge time of about 14 hours. As FIG. 6B illustrates, at a higher discharge current of 8 nA for 100,000 seconds (about 28 hours), the voltage dropped from 0.65 V to 0.15 V. It was expected that at least another 20,000 seconds (about 5.5 hours) was needed to possibly drive the battery to 0 V.

Based on the foregoing information, an energy capacity of the battery 300 was at least 272 nanoampere hours (nAh) when discharged at 8 nA. This value could be improved by at least 50% when fully discharged at 2 nA to reach the energy capacity of about 400 nAh. Considering the discharge plateau, which is located at about 0.5 V during the 2 nA discharge (FIG. 6A), the energy density was calculated to be about 200 nanowatt hours (nWh). The total size of the battery 300 as tested (when configured as a cylinder) was 3 millimeters (mm) in diameter and 400 micrometers (um) in thickness. Therefore, the effective volume of the battery 300 was about $2.826 \times 10^{-9}$ cubic meters ($m^3$), or about $2.826 \times 10^{-6}$ liters (L). Thus, the volumetric energy density was 71 milliwatt hours per liter (mWh/L), and the specific energy capacity was about 142 milliampere hours per liter (mAh/L). When considering the effective volume, the thickness of the coated GO was about 1 um, and the total thickness of the GO on the pair of electrodes was about 2 um. The effective volumetric energy density was therefore 14.2 watt hours per liter (Wh/L), and the specific energy capacity was 28.4 ampere hours per liter (Ah/L). This is higher than corresponding values of lithium batteries based on carbon nanostructured materials. Taking an effective volume as 30% of the total volume of extra-thin film lithium batteries, the effective volumetric energy density for commercial thin film batteries is from about 0.9 to about 18 Wh/L. Therefore, the battery 300 illustrates comparable and even more desirable capacities and densities than commercial thin film lithium batteries.

Example 3

Figure 7B:
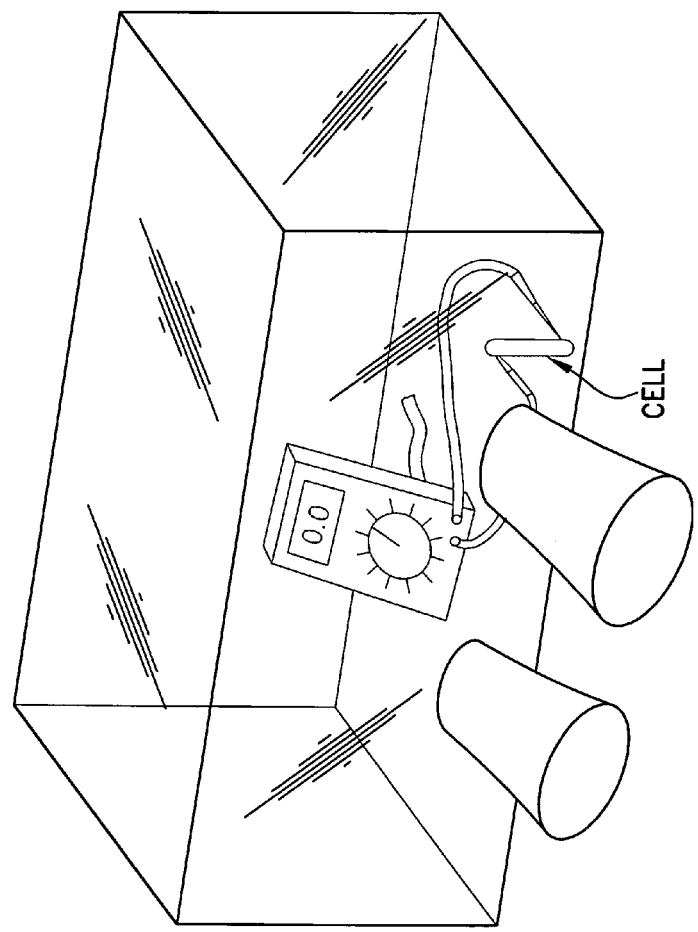
FIG. 7B is a pictorial representation of the GO proton battery being tested in a low humidity environment.

Referring now to FIGS. 7A and 7B, it can be seen that when the humidity was increased, more water was introduced into the battery 300 as fuel, and the energy capacity of the battery 300 was further increased (FIG. 7A). On the other hand, when the battery 300 was contained in a low humidity environment where there was almost no moisture (less than 10 parts per million (ppm)) (FIG. 7B), the open circuit voltage of the battery was 0 V since no source of protons was provided.

Example 4

Figure 8A:
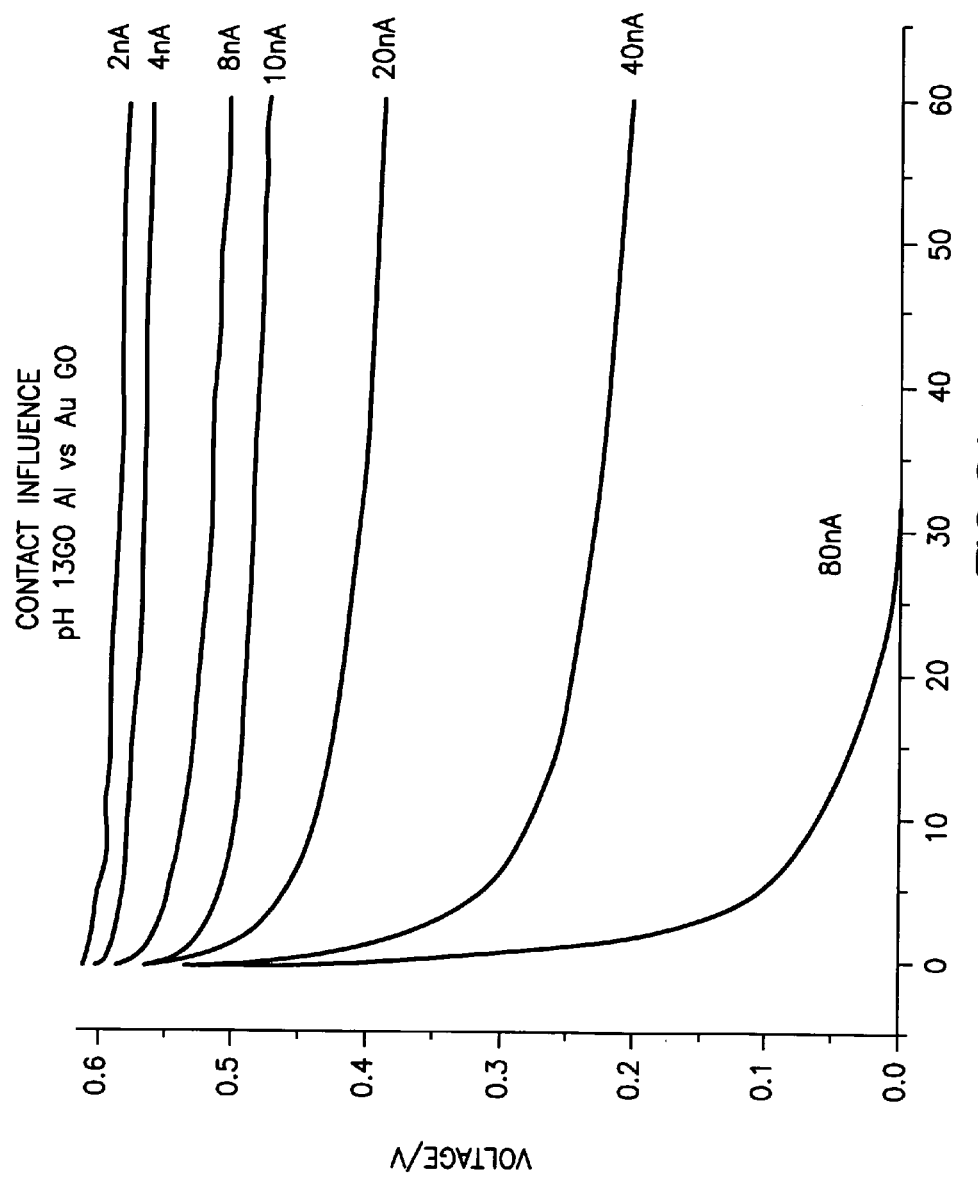

Referring to FIGS. 8A and 8B, contact influences on the battery 300 at ambient atmosphere are illustrated. When contacts of charge collectors were changed from Au-GO/Humidity/Au-GO (pH=13) to Au-GO/Humidity/Al-GO (pH=13) (FIG. 8A) and to an improved Au-coated substrate on top of a Cr adhesion layer (about 2 nm thickness) on polyethylene terephthalate (PET) (FIG. 8B), the discharge current was increased to 80 nA and 200 nA, respectively. Similar improvement was also noted by increasing the humidity in the battery 300. Without being bound by theory, it is surmised that the substrate may have introduced better contact for the GO ink deposition and provided more effective areas for the GO to release protons. In any configuration of the battery 300, metal mesh substrate or nanostructured electrode could also be used to improve the effective surface areas of the GO films and the contact areas between the GO films. With optimizations (e.g., substrate engineering and optimized coating, humidity, base cathode, and the like), it was estimated that the energy capacity could be improved at least by 100 times to reach a minimum of 40 uAh of energy capacity and 20 uWh of energy density, which corresponds to, in terms of effective volumetric energy density, an energy capacity of 2.84 KAh/L and an energy density of 1.42 KWh/L.

Example 5

Figure 9:
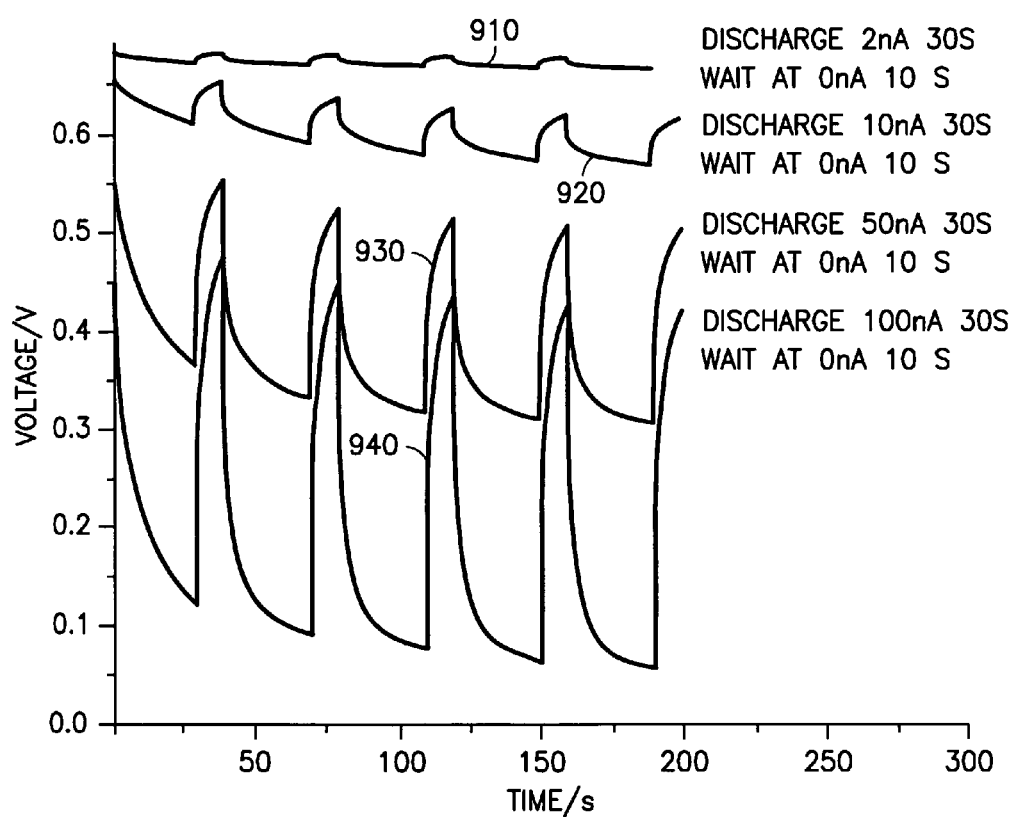
FIG. 9 is a graphical representation of continuous discharge and charge curves for a GO proton battery.

Referring now to FIG. 9, continuous discharge and charge curves for the battery 300 are illustrated. In continuously discharging and charging, the battery 300 can recover to a voltage near its $V_{oc}$ immediately after discharge without receiving energy from an external source to recharge the battery as long as the GO is not completely consumed for proton generation. As shown in FIG. 9, the battery 300 is discharged for 30 seconds. The battery 300 is then left idle (no current draw) for seconds before a second period of discharge. This pattern is repeated continuously 5 times. At low current of 2 nA (as shown by line 910), the voltage recovers quickly to $V_{oc}$. At 10 nA (line 920), 50 nA (line 930), and 100 nA (line 940), the voltage will recover quickly and then slowly increase. Without being bound by theory, it is surmised that the first time period of quick recovery may be due to capacitive charging, and the following slower increase may be due to the slower proton generation process. Thus, the battery 300 exhibits supercapacitor properties. This hybrid supercapacitor/battery, with its high volumetric energy density, may provide more energy at a specific volume in mobile devices and electric vehicles than will conventional batteries. In addition, the supercapacitor properties of the battery 300 can provide a relatively quick regeneration charge, which shortens the charging time of mobile electronics and electric vehicles.

Example 6

Figure 10:
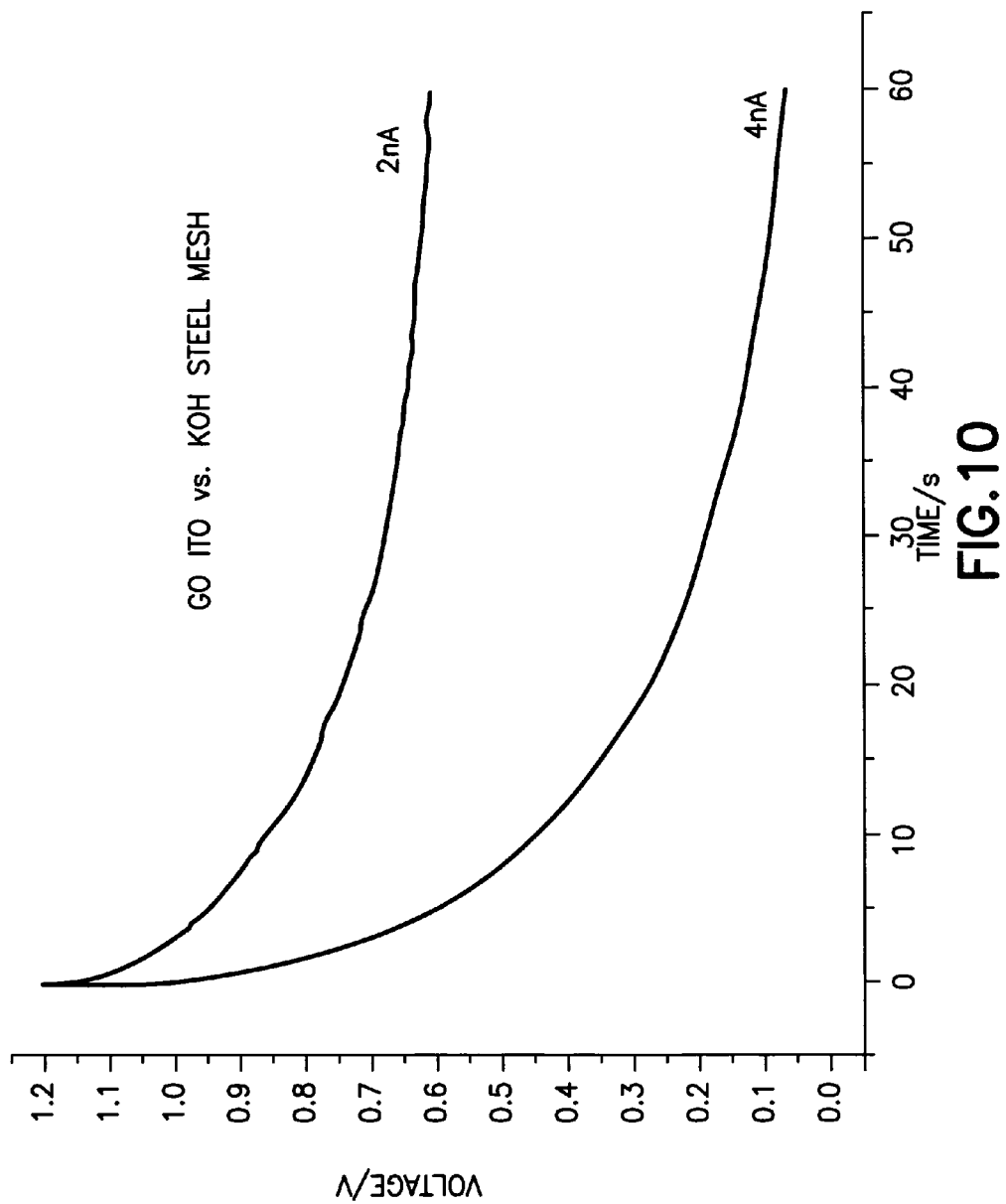
FIG. 10 is a graphical representation of a rate of discharge curve verifying a generation of protons from GO.

Referring to FIG. 10, the generation of protons from GO is verified. To verify the generation of protons, KOH was coated on steel mesh as an anode. Proton generation was verified by an experiment in which a cell of ITO/Humidity/KOH coated steel mesh was noted to not provide a voltage, but when GO was coated on one side of the cell a curve illustrating a rate of discharge was generated. This discharge curve was generated from GO protonation when the steel was contacted with the base.

Example 7

Figure 11:
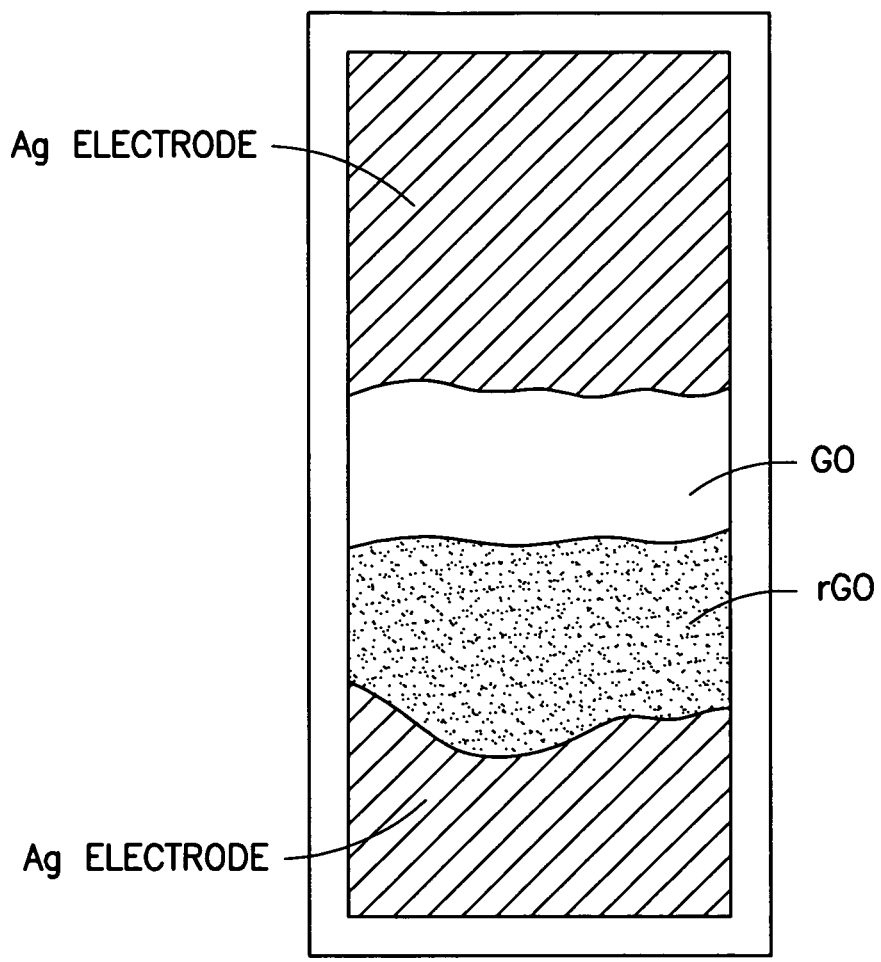
FIG. 11 is a pictorial representation of silver pad electrodes of the electrical device of FIG. 4 made by screen printing.
Figure 12:
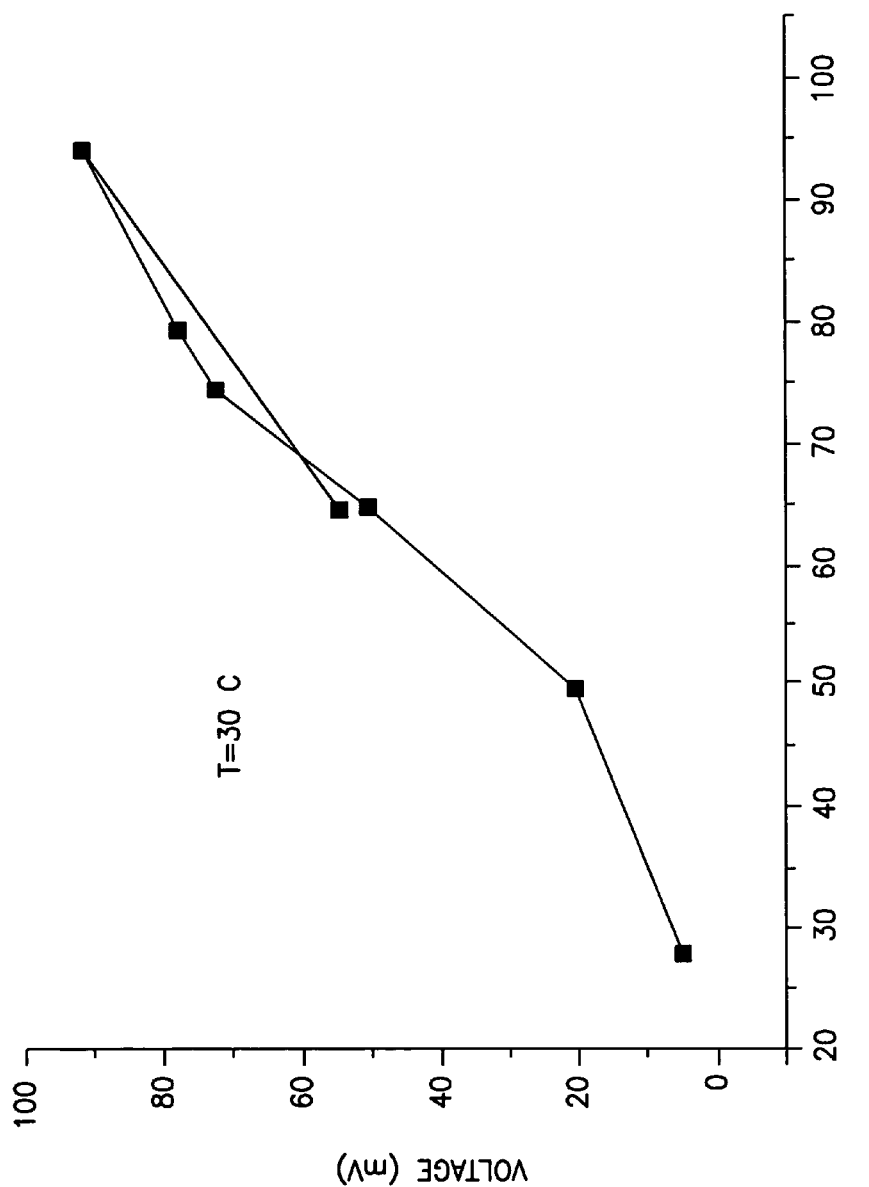
FIG. 12 is a graphical representation of voltage measured across a GO-rGO junction of the electrical device of FIG. 4.

Referring now to FIGS. 11 and 12, a junction 430 in a device 400 was obtained by a drop cast of two different GO solutions (in the first GO solution, pH=1, and in the second GO solution, pH=14) onto adjacent areas within a gap formed between two electrodes. As shown in FIG. 11, the electrodes were two Ag pads made by screen printing.

A voltage measured by a multimeter across a GO-rGO junction as a function of relative humidity is shown in FIG. 12 (measurements carried out in an environmental chamber). When the sample was under a dry air flow, the measured voltage was 0 V.

Figure 13:
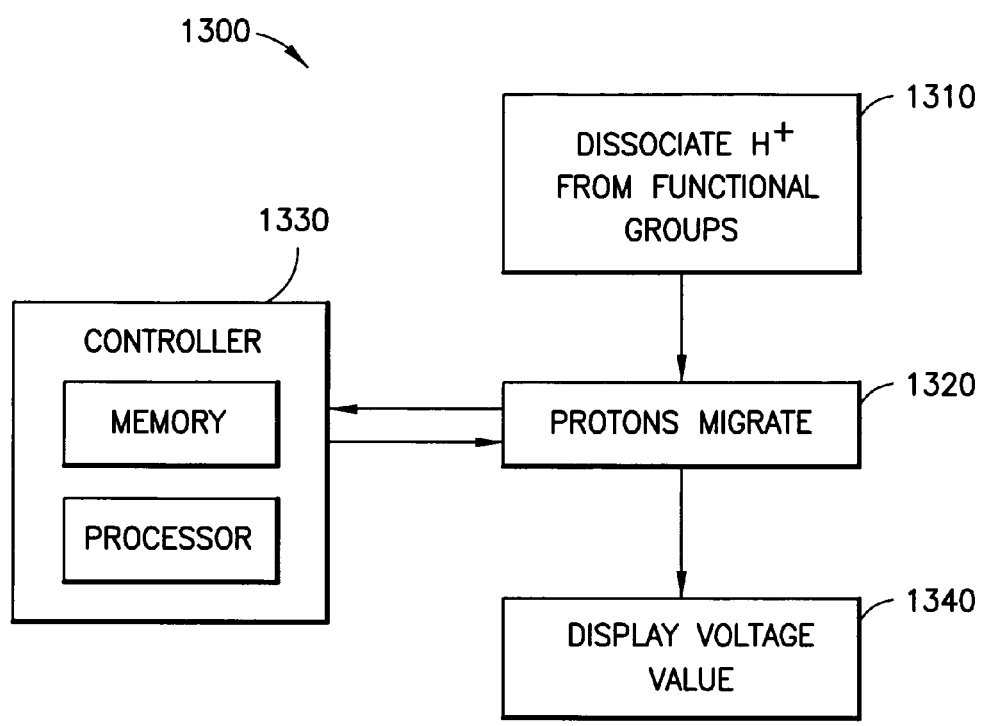
FIG. 13 is a flowchart of one exemplary method of using the GO proton battery of FIG. 3 or the electrical device of FIG. 4.

Referring now to FIG. 13, one exemplary method of using the battery 300 or device 400 is designated generally by the reference number 1300 and is hereinafter referred to as "method 1300." In a dissociation step 1310 of the method 1300, the hydrogen is dissociated from the functional groups of the GO to produce protons. As stated above, dissociation of the hydrogen is caused by the presence of water in the battery 300 or device 400. In a diffusion step 1320, the protons then migrate through the electrolyte or the junction as a result of a pH gradient. From the diffusion step 1320, an analysis step 1330 is carried out in which a voltage across the junction is measured. The analysis step 1330 is carried out by a controller having a memory and a processor. The controller may be used to convert the voltage into, for example, a relative humidity measurement. In a display step 1340, the value representing the voltage is then determined and displayed. Migration of the protons may also be carried out from the second material, through the junction, and back to the GO upon the application of humidity and removal of any current draw on the battery 300 or device 400.

In the exemplary embodiments described herein, an apparatus comprises an anode formed of graphene oxide from an acidic pH; a cathode from a pH greater than the acidic pH of the anode; an electrolyte positioned between and in contact with each of the anode and the cathode; and charge collectors deposited on the anode and the cathode. The anode may be formed of graphene oxide from inks and have a pH of about 1 to about 4. The cathode may be formed of graphene oxide from inks and have a pH of about 13 to about 14. The cathode may comprise a base coated onto a mesh electrode. The base may be KOH, and the mesh electrode may be stainless steel. The electrolyte may be a synthetic ionomer such as sulfonated tetrafluoroethylene-based fluoropolymer-copolymer or one or more of a liquid electrolyte and water vapor. The charge collectors may be one or more of Au, Cr, Ag, Al, Cu, and ITO. In one exemplary embodiment, the charge collector deposited on the anode may be Au, the cathode may be graphene oxide, the charge collector deposited on the cathode may be Au, and the electrolyte may have a relative humidity of about 15%.

Also in the exemplary embodiments described herein, another apparatus comprises a first graphene oxide-based material having a first functionality of a first concentration; a second material having a second functionality of a second concentration; a junction defined by an interface of the first graphene oxide-based material positioned adjacent and in contact with the second material; and electrodes formed on each of the first graphene oxide-based material and the second material. Protons are configured to be dissociated from the first functionality of the first graphene oxide-based material by water (protons may also be dissociated from the second material, but with a different concentration) and are configured to be migratable across the junction to the second material based on a pH gradient across the first graphene oxide-based material and the second material. The second material may comprise a graphene derivative, reduced graphene oxide, BN, $MS_2$, $WS_2$, $NbSe_2$, $Bi_2Sr_2CaCu_2O_x$, or a combination of any of the foregoing materials. The interface of the first graphene oxide-based material and the second material may be graded. The first graphene oxide-based material may have a first relative humidity value, and the second material may have a second relative humidity value. Humid air may be located at the junction. The apparatus may further comprise means for allowing the protons to be migratable from the second material across the junction to the first graphene oxide-based material.

In the exemplary embodiments described herein, a method comprises dissociating hydrogen from functional groups of a first graphene oxide-based material to form protons; causing the protons to diffuse from the first graphene oxide-based material across a junction to a second material; and determining a value representing a voltage based on the diffusion of the protons to the second material.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus, comprising:
    an anode formed of graphene oxide from an acidic pH;
    a cathode from a pH greater than the acidic pH of the anode; and
    charge collectors deposited on the anode and the cathode;
    wherein the anode comprises graphene oxide, the graphene oxide comprising an ink and having a pH of about 1 to about 4;
    wherein a difference between the acidic pH of the graphene oxide and a higher pH dissociates protons coupled to the graphene oxide to cause the protons to migrate from the graphene oxide of the anode to the cathode to regenerate the apparatus;
    wherein the cathode is formed of graphene oxide from inks and has a pH of about 13 to about 14.

2. The apparatus of claim 1, wherein an electrolyte comprising a synthetic ionomer is positioned between and in contact with each of the anode and the cathode.

3. The apparatus of claim 2, wherein the synthetic ionomer comprises sulfonated tetrafluoroethylene-based fluoropolymer-copolymer.

4. The apparatus of claim 1, wherein the charge collectors comprise one or more of Au, Cr, Ag, Al, Cu, and indium tin oxide.

5. The apparatus of claim 1, wherein the charge collector deposited on the anode comprises Au, the cathode comprises graphene oxide, the charge collector deposited on the cathode comprises Au, and an electrolyte has a relative humidity of about 15%.

* * * * *